United States Patent
Muraguchi

(10) Patent No.: US 7,961,146 B2
(45) Date of Patent: Jun. 14, 2011

(54) POSITIONING METHOD, COMPUTER PROGRAM, POSITIONING DEVICE, AND ELECTRONIC APPARATUS

(75) Inventor: Yoshiyuki Muraguchi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 196 days.

(21) Appl. No.: 12/338,424

(22) Filed: Dec. 18, 2008

(65) Prior Publication Data

US 2009/0167603 A1    Jul. 2, 2009

(30) Foreign Application Priority Data

Dec. 27, 2007   (JP) ................................ 2007-335945

(51) Int. Cl.
  *G01S 19/37*  (2010.01)
  *G01S 19/45*  (2010.01)
(52) U.S. Cl. .............................. 342/357.77; 342/357.28
(58) Field of Classification Search ............ 342/357.05, 342/357.77, 357.28
See application file for complete search history.

(56) References Cited

U.S. PATENT DOCUMENTS 6,516,021 B1 *   2/2003   Abbott et al. ................. 375/150
2004/0150557 A1 *   8/2004   Ford et al. ................. 342/357.14

FOREIGN PATENT DOCUMENTS

JP        2001-337156 A       12/2001

* cited by examiner

*Primary Examiner* — Thomas H Tarcza
*Assistant Examiner* — Harry Liu
(74) *Attorney, Agent, or Firm* — Global IP Counselors, LLP

(57) ABSTRACT

A positioning method in a positioning device that calculates a location of the positioning device by executing Kalman filtering includes, acquiring a satellite signal from a positioning satellite; predicting a state vector including a velocity component of the positioning device, and error covariance of the state vector; correcting the velocity component using a difference between a measured value and a predicted value of the reception signal frequency from the positioning satellite; determining accuracy of the corrected velocity component based on the error covariance; setting a velocity condition based on the determined accuracy; judging a moving state of the positioning device by comparing the corrected velocity component and the velocity condition; and calculating the location by executing the Kalman filtering with a filter characteristic changed according to the judged moving state.

12 Claims, 13 Drawing Sheets

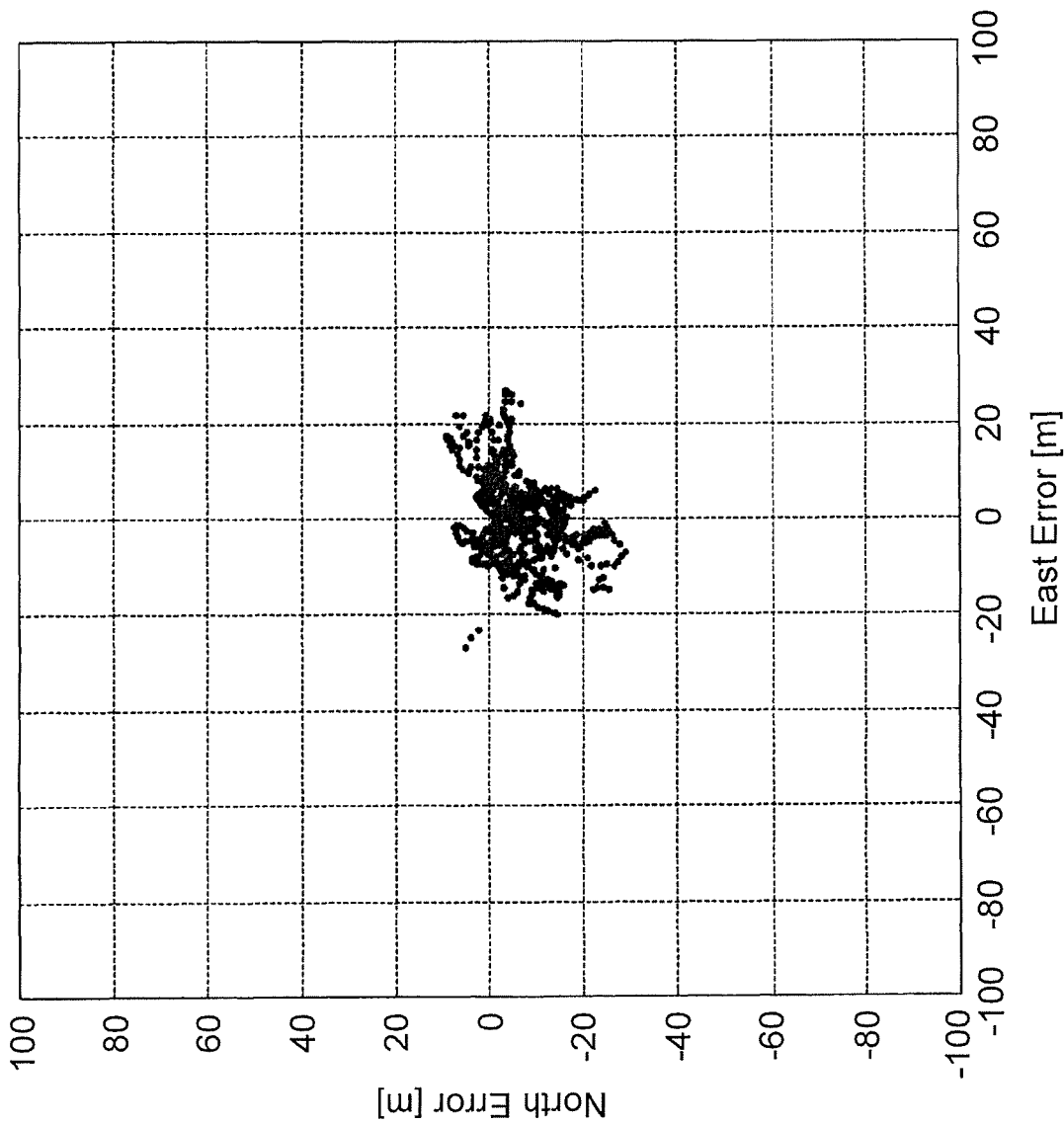

POSITIONING METHOD, COMPUTER PROGRAM, POSITIONING DEVICE, AND ELECTRONIC APPARATUS

Japanese Patent Application No. 2007-335945 filed on Dec. 27, 2007, is hereby incorporated by reference in its entirety.

BACKGROUND

1. Technical Field

The present invention relates to a positioning method, a computer program, a positioning device, and an electronic apparatus.

2. Related Art

As a positioning system that makes use of artificial satellites, a GPS (Global Positioning System) is widely known. The GPS is used in positioning devices incorporated in a portable phone, a car navigation apparatus, and the like. In the GPS, a positioning device measures the present location of the device by performing positioning calculation for calculating values of four parameters, i.e., coordinate values of three dimensions indicating the location and the clock error of the device, on the basis of information such as locations of plural GPS satellites and pseudo distances from the respective GPS satellites to the device.

However, in the positioning performed by using satellite signals from positioning satellites, there are various error factors such as the influence caused by a so-called multi-path and it is difficult to prevent occurrence of positioning errors. Therefore, various techniques for reducing the positioning errors are devised. As an example of the techniques, JP-A-2001-337156 discloses a technique concerning positioning processing employing a Kalman filter.

The technique disclosed in JP-A-2001-337156 is a technique for comparing the velocity of a positioning device and a threshold of velocity set in advance to thereby judge whether the positioning device remains stationary and changing parameters of the Kalman filter on the basis of a result of the judgment. However, since the threshold of velocity is set as a fixed value, it is likely that an accurate positioned location (a location subjected to filtering by the Kalman filter) is not calculated unless a moving state of the positioning device is properly judged.

As a specific example, when a user carrying the positioning device is walking, in some case, the measured velocity of the positioning device does not meet the threshold and the positioning device is judged as remaining stationary regardless of the fact that the positioning device is actually moving. In this case, a parameter for judging that the positioning device is in a stationary state is set in the parameters of the Kalman filter. As a result, the Kalman filter acts to suppress fluctuation in the positioned location. Therefore, a location delay occurs in the positioned location with respect to an actual location of the positioning device and follow-up ability of the positioned location falls.

When the user carrying the positioning device is driving a car, in some case, even in a state in which the car is stopped, the velocity of the positioning device is not correctly measured if a reception environment of satellite signals is dissatisfactory and, regardless of the fact that the positioning device actually remains stationary, the positioning device is misjudged as moving. In this case, a parameter for judging that the positioning device is in a moving state is set in the parameters of the Kalman filter. As a result, since the Kalman filter acts to facilitate fluctuation in a positioned location, it is likely that a location far apart from an actual location of the positioning device is outputted.

SUMMARY

An advantage of some aspects of the invention is to provide a positioning method, a computer program, a positioning device, and an electronic apparatus that can solve the problems.

According to an aspect of the invention, there is provided a positioning method in a positioning device that calculates a location of the positioning device by executing Kalman filtering. The positioning method includes: acquiring a satellite signal from a positioning satellite; predicting a state vector including a velocity component of the positioning device, and error covariance of the state vector; correcting the velocity component using a difference between a measured value and a predicted value of the reception signal frequency from the positioning satellite; determining accuracy of the corrected velocity component based on the error covariance; setting a velocity condition based on the determined accuracy; judging a moving state of the positioning device by comparing the corrected velocity component and the velocity condition; and calculating the location by executing the Kalman filtering with a filter characteristic changed according to the judged moving state.

According to another aspect of the invention, there is provided a positioning device that calculates a location of the positioning device by executing Kalman filtering. The positioning device includes: a signal acquiring unit that acquires a satellite signal from a positioning satellite; a state vector predicting unit that predicts a state vector including a velocity component of the positioning device, and error covariance of the state vector; a velocity component correcting unit that corrects the velocity component using a difference between a measured value and a predicted value of the reception signal frequency from the positioning satellite; an accuracy determining unit that determines accuracy of the corrected velocity component based on the error covariance; a velocity-condition setting unit that sets a velocity condition based on the determined accuracy; a moving-state judging unit that judges the moving state of the positioning device by comparing the corrected velocity component and the velocity condition; and a location calculating unit that calculates the location by executing the Kalman filtering with a filter characteristic changed according to the judged moving state.

With the positioning method and the positioning device, accuracy of the corrected velocity component is determined based on the error covariance of the state. A velocity condition is set based on the accuracy. The corrected velocity component and the velocity condition are compared and a moving state of the positioning device is judged. The Kalman filtering is executed with the filter characteristic changed according to the moving state and the location is calculated.

For example, as the accuracy of the velocity component of the state vector is higher, the velocity condition is moving is set higher. Conversely, as the accuracy of the velocity component of the state vector is lower, the velocity condition is moving is set lower. This makes it possible to properly judge a moving state of the positioning device. Since the filter characteristic of the Kalman filter is changed to match the moving state of the positioning device, a location delay and location drop-out are prevented from occurring with respect to an actual location of the positioning device and positioning accuracy is improved.

It is preferably that, in the positioning method, the setting of the velocity condition is setting velocity conditions of plural moving states including a stationary state of the positioning device, the judging of the moving state is judging which of the plural moving states is a present moving state of the positioning device, and the calculating of the location by executing the Kalman filtering with a filter characteristic corresponding to the judged moving state among filter characteristics in association with the plural moving states.

It is preferable that, in the positioning device, the velocity-condition setting unit sets velocity conditions of plural moving states including a stationary state of the positioning device, the moving-state judging unit judges which of the plural moving states is a present moving state of the positioning device, and the location calculating unit executes the Kalman filtering with a filter characteristic corresponding to the judged moving state among filter characteristics in association with the plural moving states.

With the positioning method and the positioning device, velocity conditions of the plural moving states including the stationary state of the positioning device are set. It is judged which of the plural moving states is the present moving state of the positioning device. The location of the positioning device is calculated by executing the Kalman filtering with a filter characteristic corresponding to the judged moving state. Therefore, it is possible to properly judge a moving state of the positioning device including a stationary state and accurately calculate a positioned location.

It is preferable that, in the positioning method, the judging of the moving state is judging the moving state at a predetermined interval; and the judging of the moving state includes judging the stationary state when a velocity condition is continuously satisfied at the predetermined interval.

It is preferable that, in the positioning device, the moving-state judging unit judges a moving state at a predetermined interval; and the moving-state judging unit includes judging the stationary state when a velocity condition is continuously satisfied at the predetermined interval.

With the positioning method and the positioning device, at the predetermined interval, the moving state of the positioning device is judged. It is judged that the moving state of the positioning device is the stationary state when the velocity condition is continuously satisfied at the predetermined interval. Depending on a reception environment of a positioning signal or the like, the velocity condition for judging that the moving state is the stationary state could be accidentally satisfied regardless of the fact that the positioning device (the user) is moving. However, even in such a case, it is possible to prevent the moving state from being immediately judged as the stationary state.

It is preferable that the positioning method further includes judging a reception environment of the positioning signal based on a reception signal. The setting of the velocity condition is setting the velocity condition based on the determined accuracy and the reception environment.

It is preferable that the positioning device further includes a reception-environment judging unit that judges a reception environment of the positioning signal based on a reception signal. The velocity-condition setting unit sets the velocity condition based on the determined accuracy and the reception environment.

With the positioning method and the positioning device, a reception environment of the positioning signal is judged based on a reception signal. A velocity condition is set based on the determined accuracy of the velocity component and the judged reception environment. Since the reception environment of the positioning signal is added to criteria for setting the velocity condition, it is possible to accurately perform setting of the velocity condition. This makes it possible to more accurately judge a moving state of the positioning device.

It is preferable that, in the positioning method, the judging of the reception environment is judging whether the reception environment is at least an outdoor environment or an indoor environment, and the setting of the velocity condition includes setting a velocity condition for judging that the positioning device is in the stationary state, such that the higher the determined accuracy the lower the velocity condition for judging that the positioning device is in the stationary state, when it is judged that the reception environment is the outdoor environment.

It is preferable that, in the positioning device, the reception-environment judging unit judges whether the reception environment is at least an outdoor environment or an indoor environment, and the velocity-condition setting unit sets a velocity condition for judging that the positioning device is in the stationary state, such that the higher the determined accuracy the lower the velocity condition for judging that the positioning device is in the stationary state, when it is judged that the reception environment is the outdoor environment.

With the positioning method and the positioning device, it is judged whether the reception environment is at least the outdoor environment or the indoor environment and, when it is judged that the reception environment is the outdoor environment, the velocity condition for judging that the positioning device is in the stationary state is set lower as the determined accuracy of the velocity component is higher. Therefore, when the reception environment is the outdoor environment and as the accuracy of the velocity component is higher, it is less easily judged that the positioning device is in the stationary device.

According to still another embodiment of the invention, there is provided a computer-readable medium storing a program for causing a computer incorporated in a positioning device to execute the positioning method explained above. Moreover, according to still another embodiment of the invention, there is provided an electronic apparatus including the positioning device explained above.

BRIEF DESCRIPTION OF THE DRAWINGS

The invention will be described with reference to the accompanying drawings, wherein like numbers reference like elements.

FIG. 15 is a diagram of an example of an experiment result.

DESCRIPTION OF EXEMPLARY EMBODIMENTS

Figure 1:
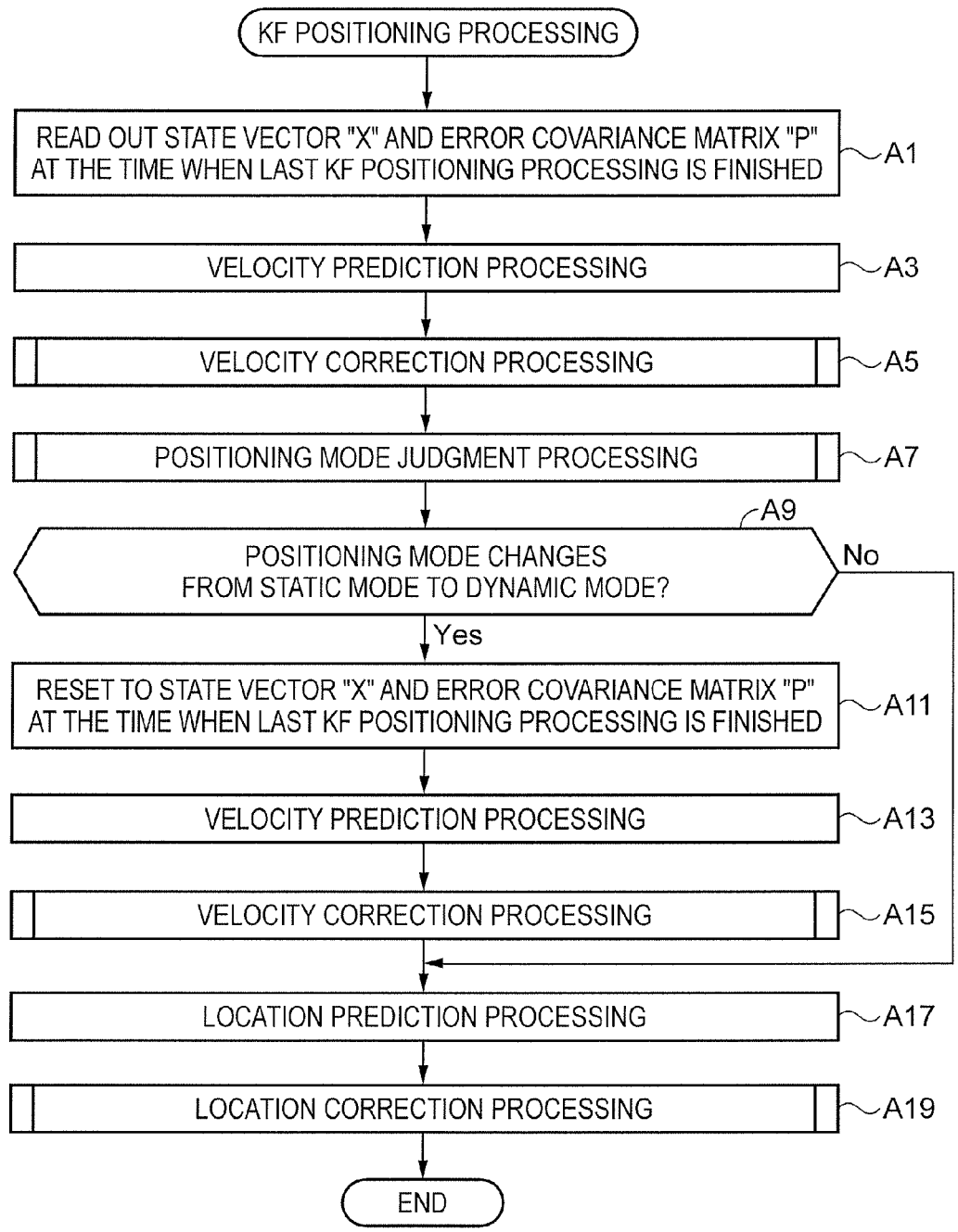
FIG. 1 is a flowchart of a flow of KF positioning processing.

Exemplary embodiments of the invention are explained below with reference to the accompanying drawings. In the following explanation, a portable phone is explained as an example of an electronic apparatus including a positioning device and a GPS is used as a positioning system. However, embodiments to which the invention is applicable are not limited to the portable phone and the GPS.

1. Principle

A portable phone 1 receives a GPS satellite signal as a positioning signal transmitted from a GPS satellite as a positioning satellite and calculates satellite information such as the location, the moving direction, and the velocity of the GPS satellite on the basis of a navigation message such as orbit information (ephemeris data and almanac data) of the GPS satellite super imposed on the received GPS satellite signal. The GPS satellite signal is a spread spectrum-modulated signal called C/A (Coarse and Acquisition) code and is superimposed on a carrier in an L1 band with 1.57542 [GHz] set as a carrier frequency.

Four GPS satellites are arranged in each of six orbital planes and operated such that, in principle, four or more satellites can always be observed from anywhere on the earth under a geometrical arrangement. The GPS satellite that transmits an acquired GPS satellite signal is hereinafter referred to as "acquisition satellite" to distinguish the GPS satellite from the other GPS satellites.

The portable phone 1 calculates radio wave propagation time from the acquisition satellite to the portable phone 1 on the basis of a difference between reception time of a GPS satellite signal specified by a crystal clock incorporated therein and transmission time of transmission of the received GPS satellite signal from a GPS satellite. Then, the portable phone 1 calculates a distance (a pseudo distance) from the acquisition satellite to the portable phone 1 by multiplying the calculated radio wave propagation time by light velocity.

The portable phone 1 positions the present location of the portable phone 1 by performing positioning calculation for calculating values of four parameters, i.e., coordinate values of three dimensions indicating the location and the clock error of the portable phone 1, on the basis of information such as satellite information of plural acquisition satellites and distances (pseudo distances) from the respective acquisition satellites to the portable phone 1.

In this embodiment, the portable phone 1 performs positioning processing employing a method of least squares (hereinafter referred to as "LS (Least Square) positioning method") in positioning for the first time after the start of the GPS and performs positioning processing employing a Kalman filter (hereinafter referred to as "KF (Kalman Filter) positioning processing) in positioning for a second and subsequent times to position the present location. Explanation of the LS positioning processing is omitted because the LS positioning processing is well-known processing. The KF positioning processing in this embodiment is explained in detail.

The Kalman filter is an estimation method based on probability theory for estimating a state amount, which changes every moment, using an observation value including an error.

In this embodiment, a state of the portable phone 1 is represented by a state vector "X" and the covariance of an error between the state vector "X" and a true value is represented by an error covariance matrix "P".

The state vector "X" is an eight-dimensional vector including, as components, a location vector (x, y, z) in three dimensions, a clock bias (b), a velocity vector (u, v, w) in three dimensions, and a clock drift (d) of the portable phone 1. The error covariance matrix "P" is an 8×8 matrix indicating the covariance of errors of the respective components of the state vector "X".

In the KF positioning processing, the portable phone 1 performs prediction processing (Prediction) and correction processing (Correction) for the state vector "X" and the error covariance matrix "P". In the following explanation, a unit representing passage of time on this calculation processing (a predetermined time interval on the calculation processing) is referred to as "time". The portable phone 1 positions the present location of the portable phone 1 at every time while advancing the time at every moment.

FIG. 1 is a flowchart of a flow of the KF positioning processing according to this embodiment.

First, the portable phone 1 reads out the state vector "X" and the error covariance matrix "P" at the time when the KF positioning processing is finished last time (step A1). The portable phone 1 performs velocity prediction processing for predicting the velocity of the portable phone 1 using the read out state vector "X" and error covariance matrix "P" (step A3). Specifically, the portable phone 1 calculates prediction values of the present state vector "X" and the present error covariance matrix "P" according to Formulas (1) and (2).

$$X_t^- = X_{t-1}^+ \tag{1}$$

$$P_t^- = \phi_t P_{t-1}^+ \phi_t^T + Q_{t-1} \tag{2}$$

A lower suffix "t" in the formulas indicates time and upper suffixes "−1", "+", and "T" indicate a predicted value, a correction value, and a transposed matrix, respectively. "φ" indicates an 8×8 matrix called a state transition matrix and "Q" indicates an 8×8 matrix called process noise. An arrangement of rows and columns of the state transition matrix "φ" and the process noise "Q" corresponds to components in eight dimensions (x, y, z, b, u, v, w, and d) of the state vector "X".

In this embodiment, the portable phone 1 performs calculation using the state transition matrix "φ" represented by the following Formula (3).

$$\phi = \begin{bmatrix} 1 & 0 & 0 & 0 & dt & 0 & 0 & 0 \\ 0 & 1 & 0 & 0 & 0 & dt & 0 & 0 \\ 0 & 0 & 1 & 0 & 0 & 0 & dt & 0 \\ 0 & 0 & 0 & 1 & 0 & 0 & 0 & dt \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix} \tag{3}$$

where, "dt" indicates a time difference between the time of the last KF positioning processing and the present time (the time of this KF positioning processing).

As it is seen from Formula (1), in the velocity prediction processing, a correction value of the state vector "X" at immediately preceding time is set as a predicted value of the present vector "X". In other words, the portable phone 1 predicts that the present velocity of the portable phone 1 is the same as velocity calculated at immediately preceding time. After performing the velocity prediction processing, the portable phone 1 performs velocity correction processing for correcting predicted velocity (step A5).

Figure 2:
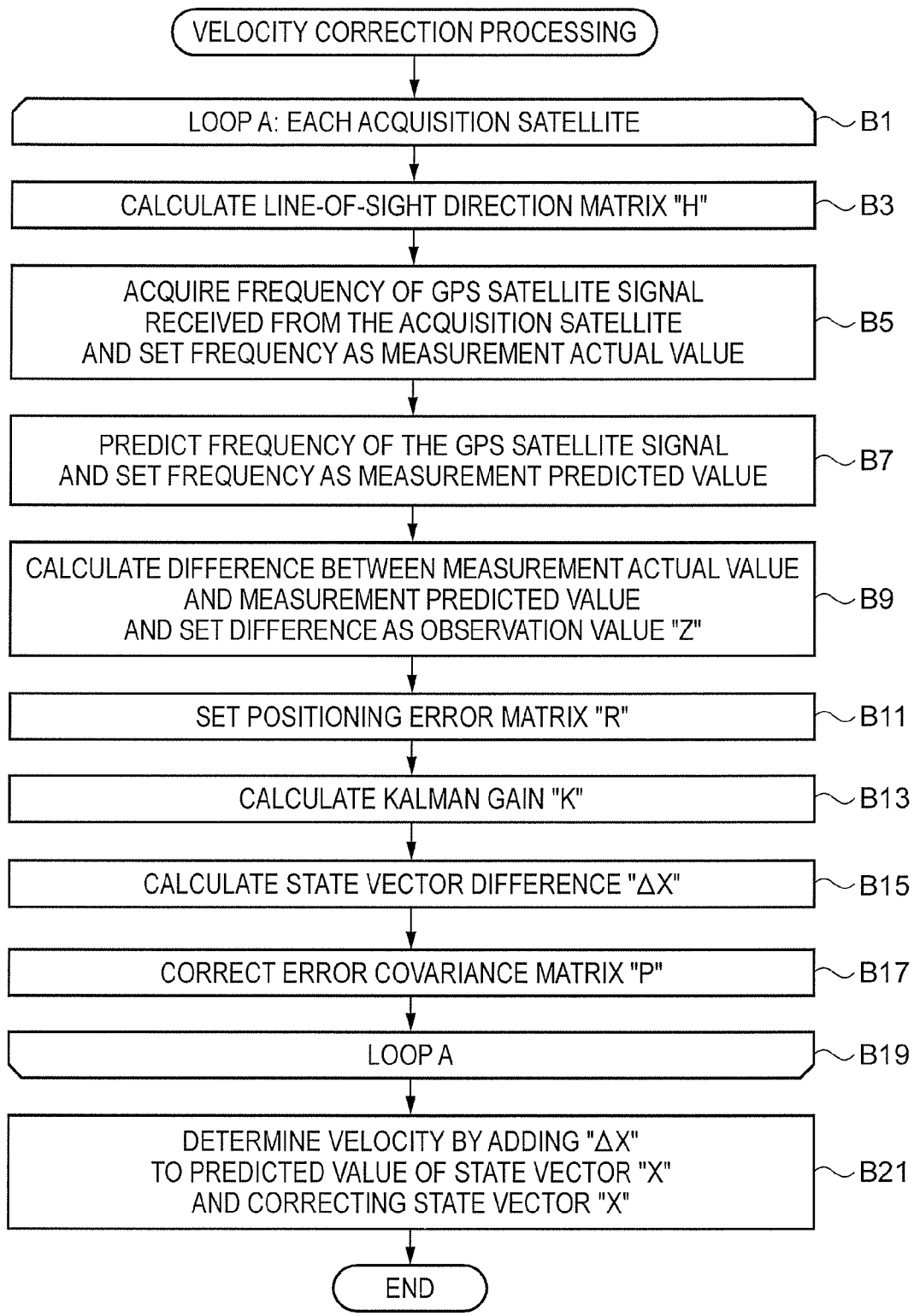
FIG. 2 is a flowchart of a flow of velocity correction processing.

FIG. 2 is a flowchart of a flow of the velocity correction processing.

In the velocity correction processing, the portable phone 1 executes processing of a loop A for the respective acquisition satellites (steps B1 to B19). In the loop A, first, the portable phone 1 calculates, on the basis of information such as the location, the moving direction, and the velocity of the acquisition satellite (satellite information) and information such as the location, the moving direction, and the velocity of the portable phone 1 (hereinafter collectively referred to as "phone information") obtained from a predicted value of the state vector "X", a line-of-sight direction matrix "H" indicating a line of sight direction from the portable phone 1 to the acquisition satellite (step B3).

Subsequently, the portable phone 1 acquires a reception frequency at which a GPS satellite signal from the acquisition satellite is received and sets the reception frequency as a measured value concerning the reception frequency (the measured value concerning the received GPS satellite signal is hereinafter referred to as "measurement actual value") (step B5). The frequency of the GPS satellite signal is specified at 1.57542 [GHz]. However, a reception frequency in the portable phone 1 changes according to a relative change in a moving direction and moving velocity between a GPS satellite and the portable phone 1. This frequency shift is a so-called Doppler frequency. The reception frequency is a frequency after shift by the Doppler frequency.

The portable phone 1 predicts a reception frequency of the GPS satellite signal on the basis of the satellite information of the acquisition satellite and the phone information and sets the reception frequency as a predicted value concerning a reception frequency (a predicted value of a measurement actual value is hereinafter referred to as "measurement predicted value") (step B7). The portable phone 1 calculates, concerning the reception frequency, a difference between the measurement actual value acquired in step B5 and the measurement predicted value calculated in step B7 and sets the difference as an observation value "Z" of the acquisition satellite (step B9).

It is possible to calculate amounts of changes in the three-dimensional velocity vector (u, v, w) and the clock drift (d) of the state vector "X" by setting the difference between the measured value and the predicted value of the reception frequency of the GPS satellite signal as an input value of the Kalman filter. In this case, amounts of changes in the three-dimensional location vector (x, y, z) and the clock bias (b) of the state vector "X" are "0".

Thereafter, the portable phone 1 sets a predetermined measurement error matrix "R" as a matrix indicating a measurement error of the observation value "Z" used in the velocity correction processing (step B11). The portable phone 1 calculates a Kalman gain "K" according to the following Formula (4) using the predicted value of the error covariance matrix "P", the line-of-sight direction matrix "H", and the measurement error matrix "R" calculated in the velocity prediction processing (step B13).

$$K_t = P_t^- H_t^T (H_t P_t^- H_t^T + R_t)^{-1} \quad (4)$$

The portable phone 1 calculates a state vector difference "ΔX" according to the following Formula (5) using the Kalman gain "K", the observation value "Z", and the line-of-sight direction matrix "H" (step B15).

$$\Delta X_t = \Delta X_t + K_t(Z_t - H_t \Delta X_t) \quad (5)$$

The portable phone 1 corrects the error covariance matrix "P" according to the following Formula (6) using the Kalman gain "K", the line-of-sight direction matrix "H", and the predicted value of the error covariance matrix "P" (step B17).

$$P_t^+ = (I - K_t H_t) P_t^- \quad (6)$$

where, "I" indicates a unit matrix.

The portable phone 1 sequentially applies the processing in steps B3 to B17 to all the acquisition satellites and updates the state vector difference "ΔX" and the error covariance matrix "P". The portable phone 1 determines the velocity of the portable phone 1 by adding, according to the following Formula (7), the state vector difference "ΔX" to the predicted value of the state vector "X" calculated in the velocity prediction processing and correcting the state vector "X" (step B21).

$$X_t^+ = X_t^- + \Delta X_t \quad (7)$$

In the state vector "X" obtained in step B21, the three-dimensional velocity vector (u, v, w) and the clock drift (d) are corrected from the predicted values, respectively. This is because the state vector difference "ΔX" is calculated with the difference between the measurement actual value and the measurement predicted value concerning the reception frequency of the GPS satellite signal set as the observation value "Z" as explained above. It is possible to calculate velocity at the present time from the three-dimensional velocity vector (u, v, w) of the state vector "X" after correction.

Referring back to the KF measurement processing shown in FIG. 1, after performing the velocity correction processing, the portable phone performs positioning mode judgment processing (step A7). The positioning mode judgment processing is processing for judging, on the basis of velocity calculated from the state vector "X" determined in the velocity correction processing and an error of velocity (hereinafter referred to as "velocity error") calculated from the error covariance matrix "P", a mode in which the portable phone 1 performs positioning. The positioning mode judgment processing is one of characteristic kinds of processing in this embodiment.

In this embodiment, there are two kinds of modes, i.e., a "dynamic mode" and a "static mode", as positioning modes. The dynamic mode is a positioning mode that is set when it is judged that the portable phone 1 is in the moving state. On the other hand, the static mode is a positioning mode that is set when it is judged that the portable phone 1 is in the stationary state. In this embodiment, a filter characteristic of the Kalman filter is changed by performing the velocity prediction processing in step A3 using different process noises "Q" for the two positioning modes, respectively.

Figure 4:
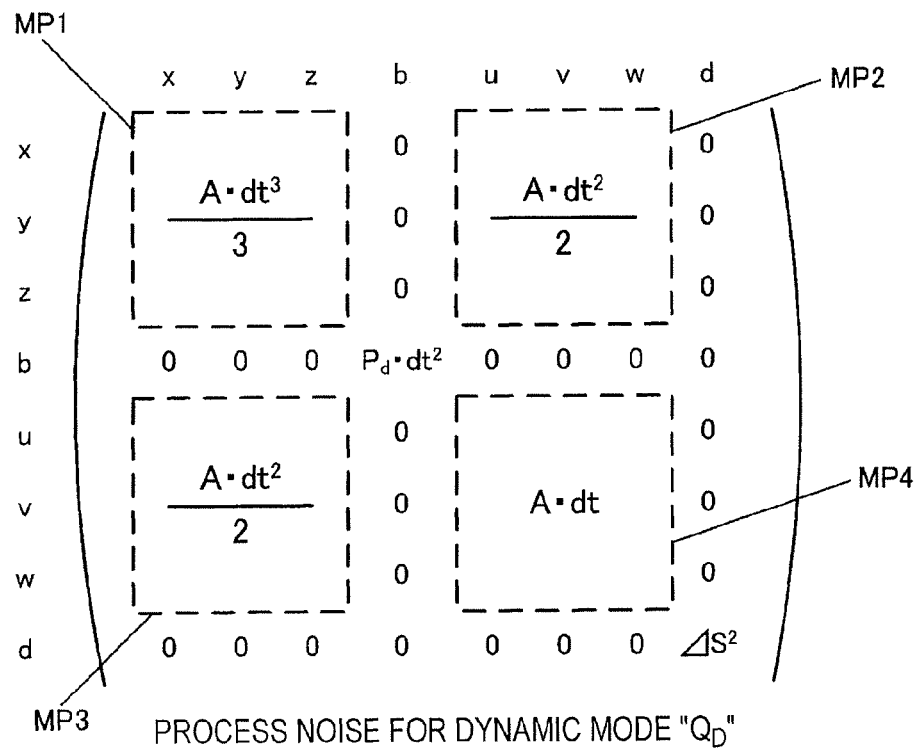
FIG. 4 is a diagram of an example of a process noise for dynamic mode "$Q_D$".

FIG. 4 is a diagram of an example of a process noise for dynamic mode "$Q_D$", which is a process noise used in the dynamic mode. In the process noise for dynamic mode "$Q_D$", components in a 3×3 matrix part MP4 at the upper left are "A·dt³/3", components in a 3×3 matrix part MP2 at the upper right and in a 3×3 matrix part MP3 at the lower left are "A·dt²/2", and components in a 3×3 matrix part MP4 at the lower right are "A·dt". "A" indicates a constant determined on the basis of a signal intensity and the like of the GPS satellite signal.

In the process noise for dynamic mode "$Q_D$", a crossing component of the clock bias "b" is "$P_d \cdot dt^2$" and a crossing component of the clock drift "d" is "$\Delta S^2$". "$P_d$" indicates a clock drift component of the error covariance matrix "P" calculated in the last KF positioning processing and "$\Delta S^2$" indicates a difference between a predicted value of the present clock drift and a predicted value of the last clock drift. All components other than those explained above are "0".

Figure 5:
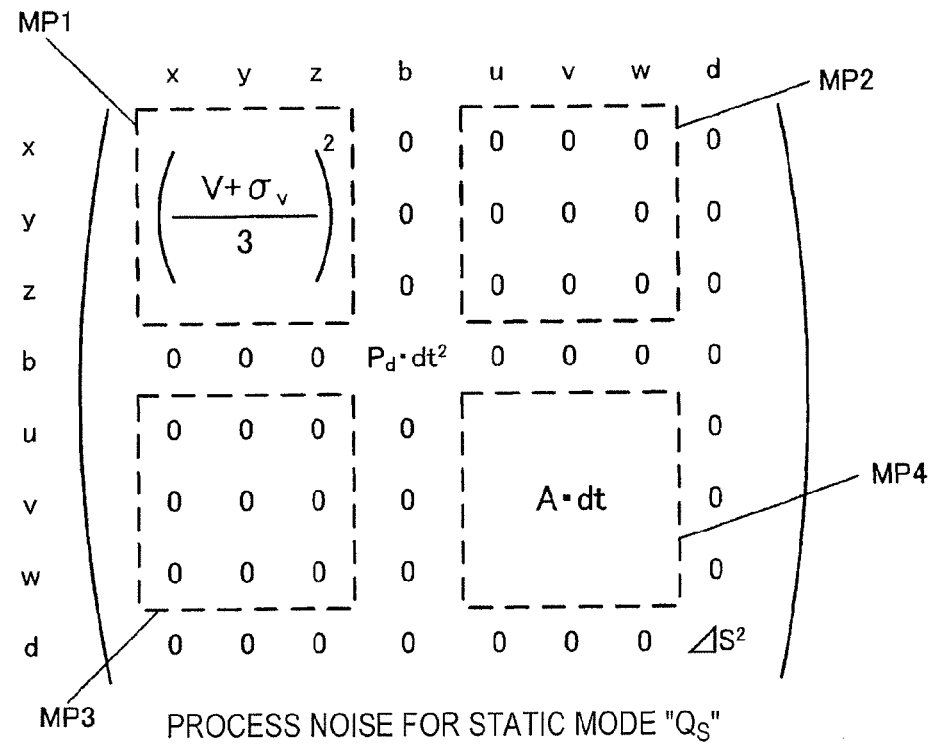
FIG. 5 is a diagram of an example of a process noise for static mode "$Q_S$".

FIG. 5 is a diagram of an example of a process noise for static mode "$Q_S$", which is a process noise used in the static mode. The process noise for static mode "$Q_S$" is different from the process noise for dynamic mode "$Q_D$" in that components of the 3×3 matrix part MP1 at the upper left are "$((V+\sigma_V)/3)^2$" and components of the 3×3 matrix part MP2 at the upper right and the 3×3 matrix part MP3 at the lower left are "0". "V" indicates velocity calculated from the state vector "X" at the time of the last KF positioning processing and "$\sigma_V$" indicates a velocity error calculated from the error covariance matrix "P" at the time when the last KF positioning is finished.

More specifically, the velocity "V" and the velocity error "$\sigma_V$" are calculated according to the following Formulas (8) and (9), respectively.

$$V=\sqrt{u^2+v^2+w^2} \quad (8)$$

$$\sigma_V=\sqrt{P_u+P_v+P_w} \quad (9)$$

where, ($P_u$, $P_v$, $P_w$) are components corresponding to (u, v, w) in the error covariance matrix "P".

In the process noise for dynamic mode "$Q_D$", the effect of the filter is reduced to increase fluctuation in a positioned location following a change in time by setting the components of the matrix part MP1 as "$A \cdot dt^3/3$" and setting the components of the matrix part MP2 and MP3 as "$A \cdot dt^2/2$". On the other hand, in the process noise for static mode "$Q_S$", the effect of the filter is increased to reduce fluctuation in a positioned location following a change in time by setting the components of the matrix part MP1 as "$((V+\sigma V)/3)^2$" and setting the components of the matrix parts MP2 and MP3 as "0".

After performing the positioning mode judgment processing, the portable phone 1 judges whether the positioning mode changes from the static mode to the dynamic mode (step A9). When it is judged that the positioning mode does not change from the static mode to the dynamic mode (step A9; No), the portable phone 1 shifts the processing to step S17. When it is judged that the positioning mode changes from the static mode to the dynamic mode (step A9; Yes), the portable phone 1 resets the state vector "X" and the error covariance matrix "P" calculated in the velocity correction processing to the state vector "X" and the error covariance matrix "P" at the time when the last KF positioning processing is finished (step A11). The portable phone 1 performs the velocity prediction processing and the velocity correction processing again (steps A13 and A15).

When the positioning mode changes from the static mode to the dynamic mode, this means that the portable phone 1 performs the velocity prediction processing using the process noise for static mode "$Q_S$" shown in FIG. 5 in step A3. However, once the positioning mode is judged as the dynamic mode in the positioning mode judgment processing, it is inappropriate to perform the processing at the post stage using the state vector "X" and the error covariance matrix "P" calculated in the velocity correction processing in step A5. Therefore, the portable phone 1 performs the velocity prediction processing and the velocity correction processing again using the process noise for dynamic mode "$Q_D$" shown in FIG. 4.

Thereafter, the portable phone 1 performs location prediction processing for predicting the location of the portable phone 1 (step S17). Specifically, the portable phone 1 calculates, according to the following Formula (10), a predicted value of the state vector "X" by multiplying the correction value of the state vector "X" obtained in the velocity correction processing by the state transition matrix "$\phi$".

$$X_t^- = \phi X_t^+ \quad (10)$$

As it is seen from Formula (3), a diagonal component of a 3×3 matrix part corresponding to the three-dimensional velocity vector (u, v, w) in the state transition matrix "$\phi$" is a time difference "dt" between the last time and the present time. Therefore, when the correction value of the state vector "X" is multiplied by the state transition matrix "$\phi$", if attention is paid to a location component of the state vector "X", a predicted moving distance is added to a positioned location at the immediately preceding time and the present predicted location of the portable phone 1 is calculated. After performing the location prediction processing, the portable phone 1 performs location correction processing for correcting the predicted location (step A19).

Figure 3:
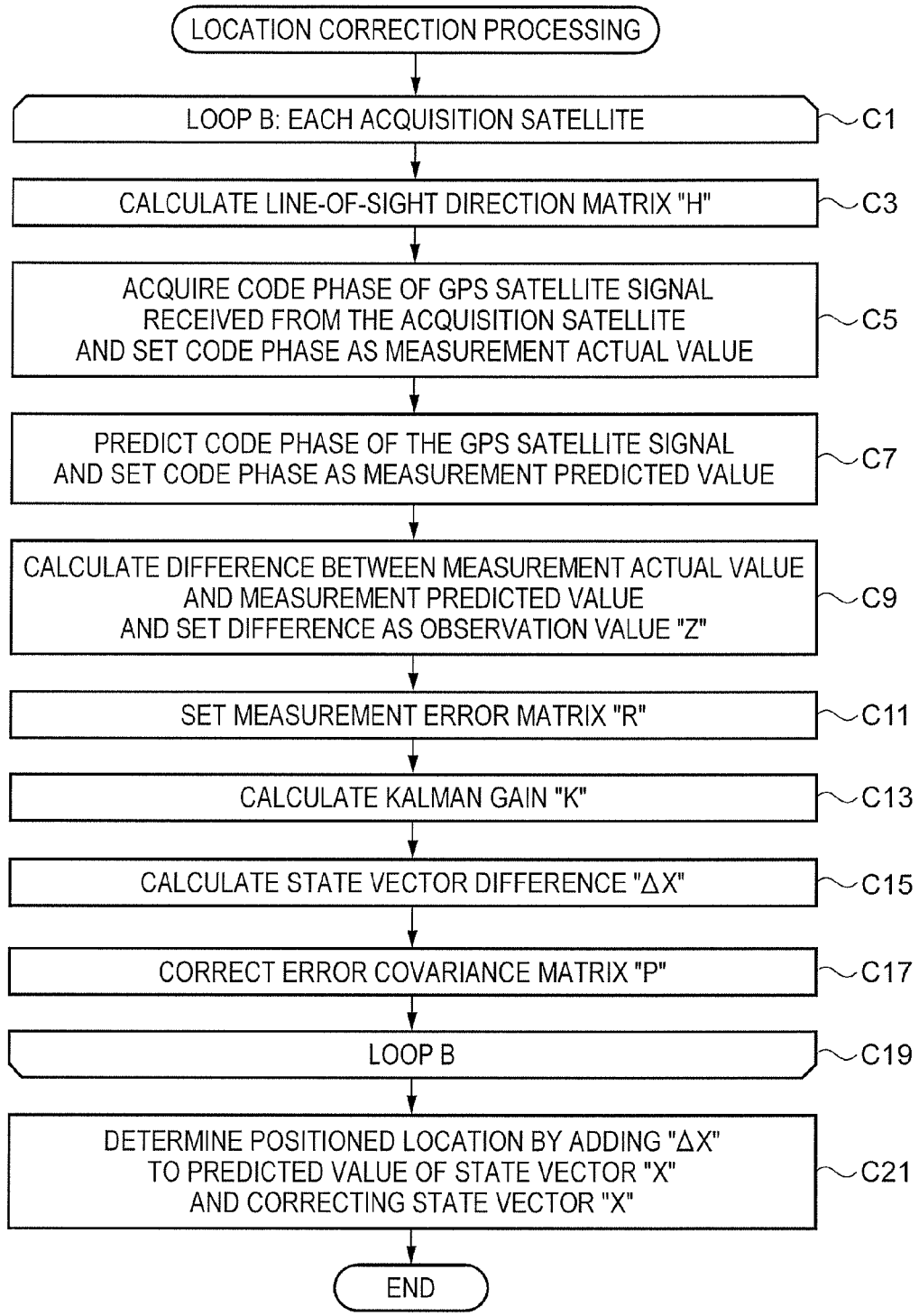
FIG. 3 is a flowchart of a flow of location correction processing.

FIG. 3 is a flowchart of a flow of the location correction processing.

Since the flow of the location correction processing is substantially the same as the flow of the velocity correction processing, differences are mainly explained. In the location correction processing, the portable phone 1 acquires a code phase of a GPS satellite signal received from the acquisition satellite and sets the code phase as a measurement actual value concerning a code phase (step C5). The portable phone 1 predicts a code phase of the GPS satellite signal and sets the code phase as a measurement predicted value concerning a code phase (step C7). The portable phone 1 calculates a difference between the measurement actual value and the measurement predicted value concerning this code phase and sets the difference as an observation value "Z", which is an input value of the Kalman filter (step C9).

The code phase is a phase of the C/A code modulated in the GPS satellite signal and is a distance equivalent value indicating a distance between the GPS satellite and the portable phone 1. Conceptually, it is possible to consider that C/A codes are continuously arranged between the GPS satellite and the portable phone 1. However, the distance between the GPS satellite and the portable phone 1 is not always an integer times as large as the length of the C/A code. In this case, length obtained by adding a fractional part to the integer times of the length of the C/A code is the distance between the GPS satellite and the portable phone 1. A phase corresponding to this fractional part is the code phase.

The code phase can be converted into and represented as a distance. Therefore, performing the location correction processing with the difference between the measurement actual value and the measurement predicted value concerning the code phase set as the observation value "Z" is equivalent to performing the location correction processing with a difference between a measured value and a predicted value of the distance between the acquisition satellite and the portable phone 1 (the length obtained by adding the fractional part to the integer times of the length of the C/A code) set as the observation value "Z". Therefore, it can be said that the code phase is a value corresponding to the distance between the acquisition satellite and the portable phone 1.

It is possible to calculate amounts of changes in the three-dimensional location vector (x, y, z) and the clock bias (b) of the state vector "X" by setting the difference between the measurement actual value and the measurement predicted value concerning the code phase of the GPS satellite signal as an input value of the Kalman filter. In this case, amounts of changes in the three-dimensional velocity vector (u, v, w) and the clock drift (d) are "0".

The portable phone 1 sequentially applies the processing in steps C3 to C17 to all the acquisition satellites and updates the state vector difference "ΔX" and the error covariance matrix "P". The portable phone 1 determines a positioned location of the portable phone 1 by adding, according to the following Formula (7), the state vector difference "ΔX" to the predicted value of the state vector "X" calculated in the location prediction processing and correcting the state vector "X" (step C21).

In the state vector "X" obtained in step C21, the three-dimensional location vector (x, y, z) and the clock bias (b) are corrected from the predicted values, respectively. This is because the state vector difference "ΔX" is calculated with the difference between the measured value and the predicted value of the code phase of the GPS satellite signal set as the observation value "Z" as explained above. A location represented by the three-dimensional location vector (x, y, z) of the state vector "X" after correction is a positioned location at the present time finally calculated.

2. Functional Configuration

Figure 6:
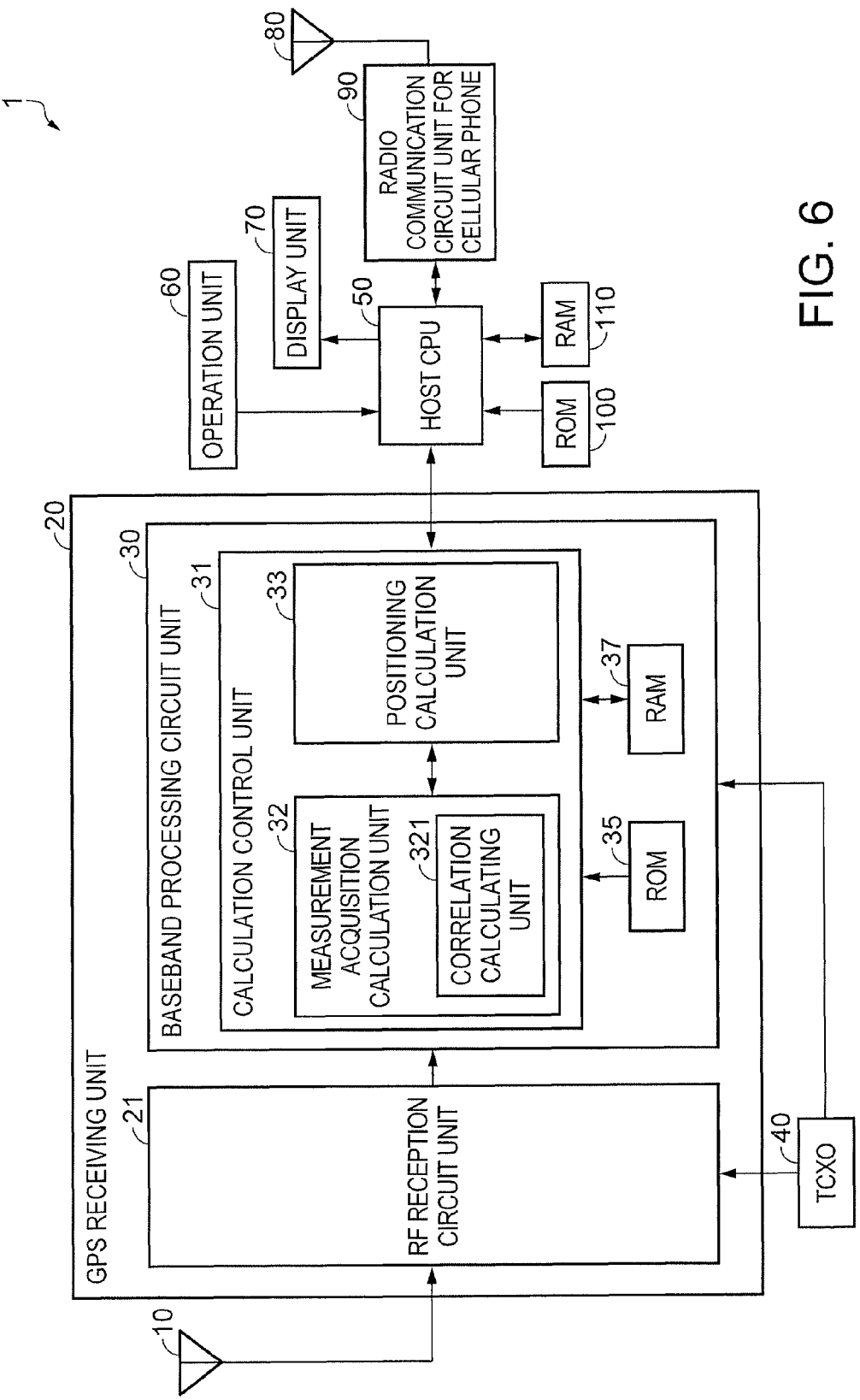
FIG. 6 is a block diagram of a functional configuration of a portable phone.

FIG. 6 is a block diagram of a functional configuration of the portable phone 1. The portable phone 1 includes a GPS antenna 10, a GPS receiving unit 20, a TCXO (Temperature Compensated Crystal Oscillator) 40, a host CPU (Central Processing Unit) 50, an operation unit 60, a display unit 70, an antenna for cellular phone 80, a radio communication circuit unit for cellular phone 90, a ROM (Read Only Memory) 100, and a RAM (Random Access Memory) 110.

The GPS antenna 10 is an antenna that receives an RF signal including a GPS satellite signal transmitted from a GPS satellite and outputs the received signal to the GPS receiving unit 20.

The GPS receiving unit 20 is a positioning unit that positions the present location of the portable phone 1 on the basis of the signal outputted from the GPS antenna 10 and is a functional block corresponding to a so-called GPS receiver. The GPS receiving unit 20 includes an RF (Radio Frequency) reception circuit unit 21 and a baseband processing circuit unit 30. The RF reception circuit unit 21 and the baseband processing circuit unit 30 can be manufactured as separate LSIs (Large Scale Integrations) or can be manufactured as one chip.

The RF reception circuit unit 21 is a circuit block for a high frequency signal (an RF signal). The RF reception circuit unit 21 divides or multiplies an oscillation signal generated by the TCXO 40 to generate an oscillation signal for RF signal multiplication. The RF reception circuit unit 21 multiplies the RF signal outputted from the GPS antenna 10 by the generated oscillation signal to down-convert the RF signal into a signal of an intermediate frequency (hereinafter referred to as "IF (Intermediate Frequency) signal"). After, for example, amplifying the IF signal, the RF reception circuit unit 21 converts the IF signal into a digital signal with an A/D converter and outputs the digital signal to the baseband processing circuit unit 30.

The baseband processing circuit unit 30 is a circuit unit that applies correlation processing or the like to the IF signal outputted from the RF reception circuit unit 21 to acquire and extract the GPS satellite signal, decodes data, extracts a navigation message, time information, and the like, and performs positioning calculation. The baseband processing circuit unit 30 includes a calculation control unit 31, a ROM 35, and a RAM 37. The calculation control unit 31 includes a measurement acquisition calculation unit 32 and a positioning calculation unit 33.

The measurement acquisition calculation unit 32 and the positioning calculation unit 33 can be manufactured as separate LSIs or can be manufactured as one chip. In this embodiment, the positioning calculation itself for the present location is explained as being executed by the positioning calculation unit 33. However, it goes without saying that all kinds of processing executed by the positioning calculation unit 33 may be executed by the host CPU 50.

The measurement acquisition calculation unit 32 is a circuit unit that acquires and tracks the GPS satellite signal on the basis of the reception signal (the IF signal) outputted from the RF reception circuit unit 21 and includes a correlation calculating unit 321. The measurement acquisition calculation unit 32 acquires information such as a reception frequency, a code phase, and the like of the acquired and tracked GPS satellite signal and outputs the information to the positioning calculation unit 33 as a measurement actual value.

The correlation calculating unit 321 performs coherent processing (correlation processing) for calculating a correlation between a C/A code and a replica code included in the reception signal using, for example, FFT operation. The correlation calculating unit 321 performs incoherent processing (correlation value integration processing) for integrating, for a predetermined number of seconds (e.g., "for one second"), a correlation value obtained as a result of the coherent processing and calculating an integrated correlation value to acquire the GPS satellite signal. The replica code is a signal simulating a C/A code, which is a kind of a PRN (Pseudo Random Noise) code, included in a simulatively-generated GPS satellite signal to be acquired. The C/A code includes 1023 chips.

If the GPS satellite signal to be acquired is not wrong, the C/A code included in the GPS satellite signal and the replica code coincide with each other (acquisition is successful). If the GPS satellite signal to be acquired is wrong, the C/A code and the replica code do not coincide with each other (acquisition is unsuccessful). Therefore, it is possible to judge whether acquisition of the GPS satellite signal is successful by judging a peak of the calculated integrated correlation value. It is possible to acquire the GPS satellite signal by changing replica codes one after another and performing correlation calculation with the same reception signal.

The correlation calculating unit 321 performs the coherent processing while changing a frequency of a generation signal of the replica code and a phase in subjecting the C/A code and the replica code to the correlation calculation. When the frequency of the generation signal of the replica code and a frequency of the reception signal coincide with each other and phases at the time of the correlation calculation of the C/A code and the replica code coincide with each other, the integrated correlation value is maximized.

More specifically, the correlation calculating unit 321 sets a predetermined range of frequencies and code phases corresponding to the GPS satellite signal to be acquired as a search range. The correlation calculating unit 321 performs, in this search range, correlation calculation in a phase direction for detecting a start position of the C/A code (a code phase) and correlation calculation in a frequency direction for detecting a frequency. The search range is set, concerning the frequency, in a frequency sweep range around 1.57542 [GHz], which is a carrier frequency of the GPS satellite signal, and set, concerning the code phase, in a code phase range of 1023 chips, which is chip length of the C/A code.

The positioning calculation unit 33 performs, on the basis of the measurement actual value inputted from the measurement acquisition calculation unit 32, positioning calculation for positioning the present location of the portable phone 1. In particular, in this embodiment, the positioning calculation unit 33 performs positioning mode judgment processing for judging a positioning mode using a reception environment of the GPS satellite signal judged on the basis of an environment judgment score and a velocity threshold set on the basis of the velocity error "$\sigma_v$". In this embodiment, as the reception environment of the GPS satellite signal, three kinds of reception environments, i.e., "outdoor", "intermediate (in the middle between outdoor and indoor)", and "indoor", are set in order of satisfaction.

Figure 7:
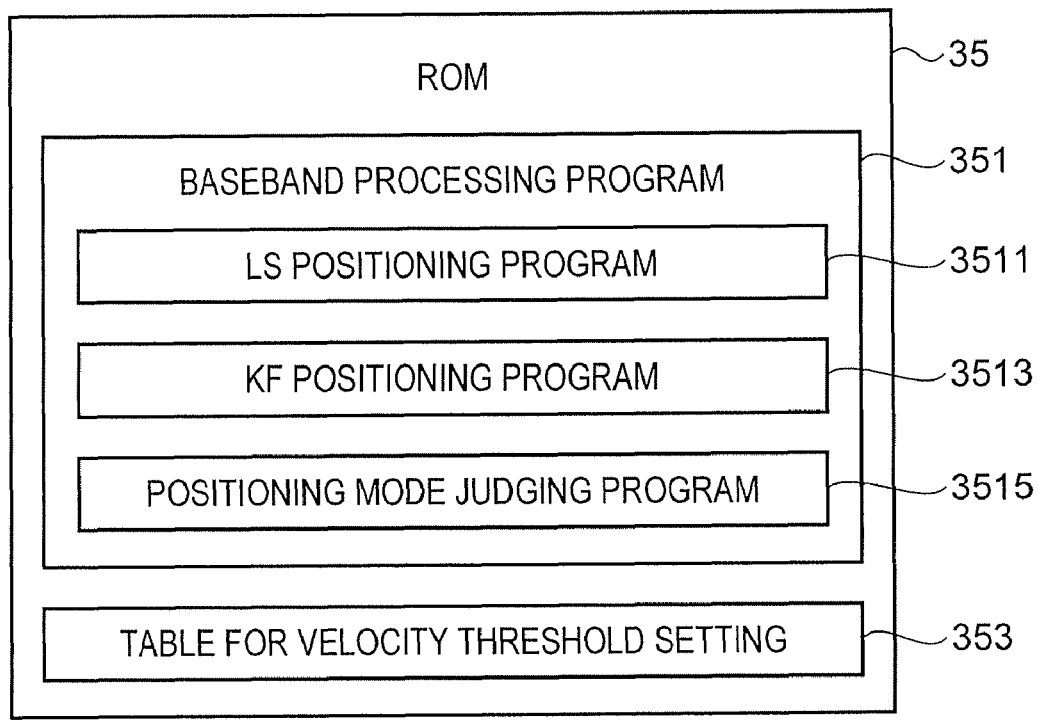
FIG. 7 is a diagram of an example of data stored in a ROM.

FIG. 7 is a diagram of an example of data stored in the ROM 35. A baseband processing program 351 read out and executed as baseband processing by the positioning calculation unit 33 (see FIG. 11) and a table for velocity threshold setting 353, which is a table for setting a velocity threshold, are stored in the ROM 35.

An LS positioning program 3511 executed as the LS positioning processing, a KF positioning program 3513 executed as the KF positioning processing (see FIGS. 1 to 3), and a positioning mode judging program 3515 executed as positioning mode judgment processing (see FIG. 12) are included in the baseband processing program 351 as subroutines.

The baseband processing is processing in which the positioning calculation unit 33 performs, in positioning for the first time, the LS positioning processing to position the present location of the portable phone 1 and performs, in positioning for a second and subsequent times, the KF positioning processing to position and output the present location of the portable phone 1. The baseband processing is explained in detail later using a flowchart.

The LS positioning processing is processing in which the positioning calculation unit 33 performs positioning calculation employing the method of least squares for plural acquisition satellites to position the present location of the portable phone 1. Explanation of LS positioning processing is omitted because processing contents of the LS positioning processing are publicly known.

The KF positioning processing is processing in which the positioning calculation unit 33 positions the present location of the portable phone 1 by performing positioning calculation employing the Kalman filter concerning plural acquisition satellites. The KF positioning processing is as explained with reference to FIGS. 1 to 3.

The positioning mode judgment processing is processing in which the positioning calculation unit 33 judges a positioning mode while variably setting a velocity threshold on the basis of the velocity "V" and the velocity error "$\sigma_v$" of the portable phone 1 and the reception environment of the GPS satellite signal judged on the basis of the environment judgment score. More specifically, the positioning calculation unit 33 judges that the positioning mode is the dynamic mode when the vehicle "V" exceeds the velocity threshold and a predetermined condition is satisfied. The positioning calculation unit 33 judges that the positioning mode is the static mode when the velocity "V" is equal to or lower than the velocity threshold and a predetermined condition is satisfied. The positioning mode judgment processing is explained in detail later with reference to a flowchart.

Figure 9:
FIG. 9 is a diagram of an example of a table structure of a table for setting a velocity threshold.

FIG. 9 is a diagram of an example of a table structure of the table for velocity threshold setting 353. A reception environment 3531, an environment judgment score 3533, and a velocity error multiplication coefficient 3535 are stored in the table for velocity threshold setting 353 in association with one another.

The reception environment 3531 indicates a reception environment of a GPS satellite signal. "Outdoor" and "intermediate" are stored in the reception environment 3531. The environment judgment score 3533 is a score for environment judgment calculated in the environment judgment processing. For example, the environment judgment score 3533 is calculated by adding up signal intensities of GPS satellite signals received from the respective acquisition satellites. The velocity error multiplication coefficient 3535 is a coefficient to be multiplied with a velocity error. A value of a multiplication result is set as a velocity threshold.

Specifically, when the environment judgment scores 3533 are included in a range of "70" to "120", it is judged that the reception environment 3531 is "outdoor". When the environment judgment score 3533 is included in a range of "10" to "69", it is judged that the reception environment 3531 is "intermediate". In both "outdoor" and "intermediate" of the reception environment 3531, the velocity error multiplication coefficient 3535 is set smaller as the environment judgment score 3533 is higher. Therefore, a smaller value is set as the velocity threshold as the environment judgment score 3533 is higher (the reception environment is better). As a result, it is easy to set the positioning mode in the dynamic mode.

When the environment judgment score 3533 is included in a range of "0" to "9", it is judged that a reception environment is "indoor". In this case, regardless of the environment judgment score, a value of the velocity error is set as the velocity threshold. Even when a reception environment is "outdoor", if the velocity error is smaller than "2 m/s", regardless of the environment judgment score, a value ¼ of (0.25 times as small as) the velocity error is set as the velocity threshold. When the velocity error increased to be equal to or larger than "3 m/s", regardless of the environment judgment score, a value of the velocity error is set as the velocity threshold.

Actually, the velocity error is generally in a range of "1 m/s" to "6 m/s" and the velocity of the portable phone 1 during walking of the user is about "1 m/s". Therefore, for example, when the velocity error is smaller than "2 m/s" in the reception environment of "outdoor", a value smaller than "1 m/s" is always set as the velocity threshold. Therefore, it is easy to set the positioning mode in the dynamic mode.

Figure 8:
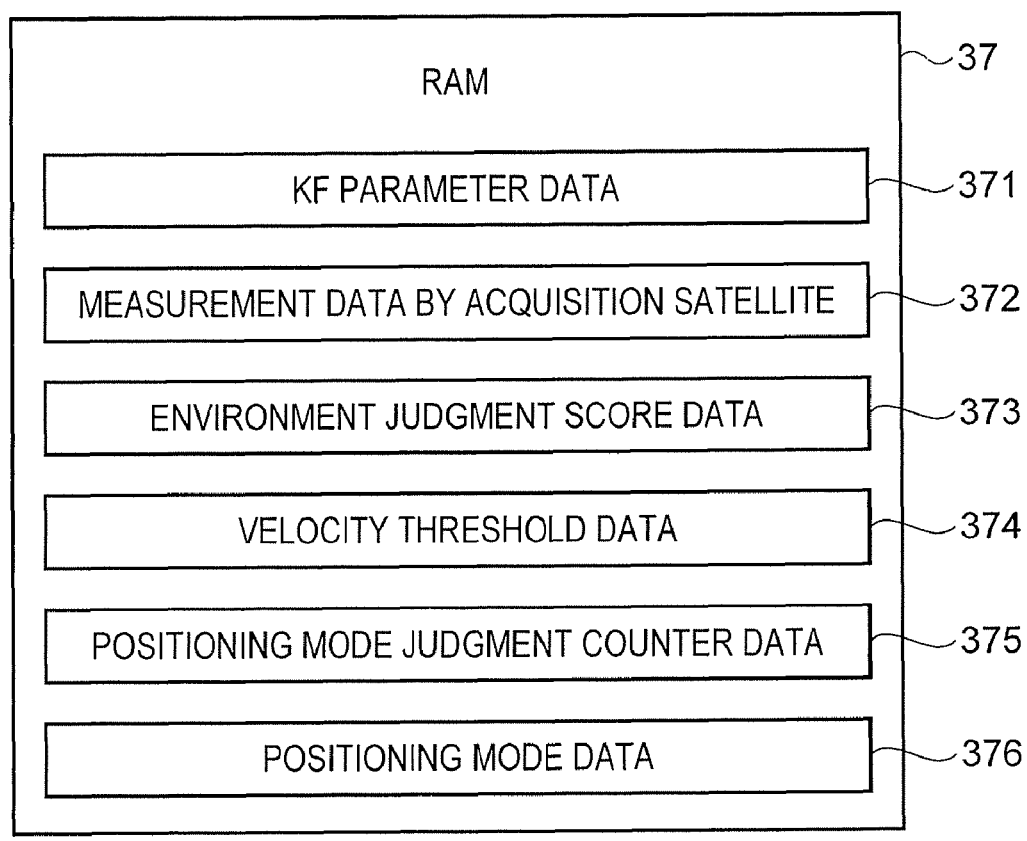
FIG. 8 is a diagram of an example of data stored in a RAM.

FIG. 8 is a diagram of an example of data stored in the RAM 37. KF parameter data 371, measurement data by acquisition satellite 372, environment judgment score data 373, velocity threshold data 374, positioning mode judgment counter data 375, and positioning mode data 376 are stored in the RAM 37.

The KF parameter data 371 is data in which values of various parameters of the Kalman filter used in the KF positioning processing are stored. The KF parameter data 371 is updated by the positioning calculation unit 33 in the KF positioning processing.

Figure 10:
FIG. 10 is a diagram of an example of a data structure of measurement data by acquisition satellite.

FIG. 10 is a diagram of an example of a data structure of the measurement data by acquisition satellite 372. An acquisition satellite 3721, a measurement actual value 3723, and a measurement predicted value 3725 are stored in the measurement data by acquisition satellite 372 in association with each other. A number of the acquisition satellite is stored in the acquisition satellite 3721. A reception frequency and a measured value and a predicted value of a code phase of a GPS satellite signal received from the acquisition satellite are stored in the measurement actual value 3723 and the measurement predicted value 3725.

For example, as the measurement actual value concerning an acquisition satellite "S1", the reception frequency is "SFreq1" and the code phase is "SCP1". As the measurement predicted value, the reception frequency is "EFreq1" and the code phase is "ECP1". In the KF positioning processing, the positioning calculation unit 33 performs velocity correction processing and the location correction processing with a difference between the measurement actual value and the measurement predicted value set as the observation value "Z".

The environment judgment score data 373 is data in which the environment judgment score calculated in the environment judgment processing is stored. The environment judgment score data 373 is updated by the positioning calculation unit 33 in the positioning mode judgment processing.

The velocity threshold data 374 is data in which the velocity threshold calculated on the basis of the environment judgment score and the velocity error "$\sigma_V$" is stored. The velocity threshold data 374 is updated by the positioning calculation unit 33 in the positioning mode judgment processing.

The positioning mode judgment counter data 375 is data in which a counter for positioning mode judgment (hereinafter referred to as "positioning mode judgment counter") is stored. The positioning mode judgment counter data 375 is updated by the positioning calculation unit 33 in the positioning mode judgment processing.

The positioning mode data 376 is data in which the dynamic mode or the static mode is stored as the positioning mode. The positioning mode data 376 is updated by the positioning calculation unit 33 in the positioning mode judgment processing.

The TCXO 40 is a temperature compensated crystal oscillator that generates an oscillation signal at a predetermined oscillation frequency. The TCXO 40 outputs the generated oscillation signal to the RF reception circuit unit 21 and the baseband processing circuit unit 30.

The host CPU 50 is a processor that collectively controls the respective units of the portable phone 1 according to various programs such as a system program stored in the ROM 100. The host CPU 50 causes the display unit 70 to display a navigation screen on which a positioned location inputted from the positioning calculation unit 33 is plotted.

The operation unit 60 is an input device including a touch panel and a button switch. The operation unit 60 outputs signals of pressed keys and buttons to the host CPU 50. Various kinds of instructions input such as a call request and transmission and reception requests for emails are performed by the operation of the operation unit 60.

The display unit 70 is a display device including an LCD (Liquid Crystal Display). The display unit 70 performs various kinds of display based on display signals inputted from the host CPU 50. The navigation screen, time information, and the like are displayed on the display unit 70.

The antenna for cellular phone 80 is an antenna for performing transmission and reception of a radio signal for cellular phone between the portable phone 1 and a radio base station set by a communication service provider of the portable phone 1.

The radio communication circuit unit for cellular phone 90 is a communication circuit unit for a cellular phone including an RF conversion circuit and a baseband processing circuit. The radio communication circuit unit for cellular phone 90 realizes a call, transmission and reception of emails, and the like by performing modulation, demodulation, and the like of a radio signal for cellular phone.

The ROM 100 stores a system program for the host CPU 50 to control the portable phone 1 and various programs, data, and the like for realizing a navigation function.

The RAM 110 forms a work area for temporarily storing the system program executed by the host CPU 50, various processing programs, data being processed in various kinds of processing, processing results, and the like.

3. Flow of Processing

Figure 11:
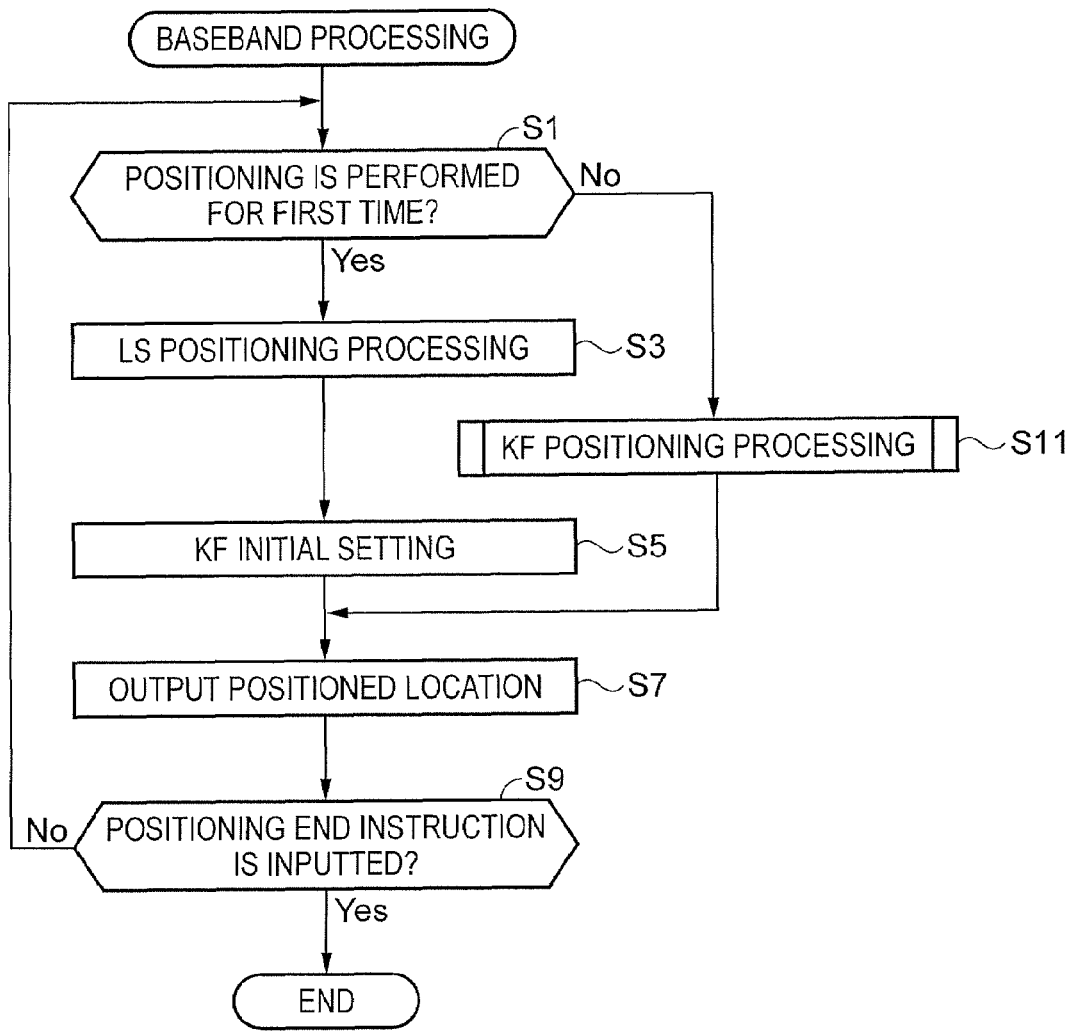
FIG. 11 is a flowchart of a flow of baseband processing.

FIG. 11 is a flowchart of a flow of baseband processing executed in the portable phone 1 when the baseband processing program 351 stored in the ROM 35 is read out and executed by the positioning calculation unit 33.

The baseband processing is processing that the positioning calculation unit 33 starts to execute when it is detected that operation for a positioning start instruction is performed on the operation unit 60 at the same time as reception of a GPS satellite signal by the RF reception circuit unit 21. The baseband processing is performed in parallel to various kinds of processing such as execution of various applications. ON and OFF of a power supply for the portable phone 1 and start and stop of the GPS may be associated with each other such that the execution of the processing is started when operation for turning on the power supply for the portable phone 1 is detected. In principle, positioning calculation is performed every second.

Although not specifically explained, it is assumed that, during the execution of the baseband processing explained below, the reception of an RF signal by the GPS antenna 10, the down-convert to the IF signal by the RF reception circuit unit 21, the acquisition and calculation of the measurement actual value by the measurement acquisition calculation unit 32, and the like are performed as occasion demands.

First, the positioning calculation unit 33 judges whether positioning is performed for the first time (step S1). When it is judged that the positioning is performed for the first time (step S1; Yes), the positioning calculation unit 33 performs the LS positioning processing by reading out and executing the LS positioning program 3511 stored in the ROM 35 (step S3). In the LS positioning program, the positioning calculation unit 33 positions the present location of the portable phone 1 by performing positioning calculation employing the method of least squares for plural acquisition satellites.

Subsequently, the positioning calculation unit 33 performs initial setting for the Kalman filter (step S5). Specifically, the positioning calculation unit 33 sets the positioned location obtained in the LS positioning processing in the location component of the state vector "X" of the Kalman filter. The positioning calculation unit 33 sets predetermined values in the other components of the state vector "X" and the respective components of the error covariance matrix "P" and stores the predetermined values in the KF parameter data 371 of the RAM 37.

The positioning calculation unit 33 outputs the positioned location calculated in the positioning processing to the host CPU 50 (step S7). The positioning calculation unit 33 judges whether a positioning end instruction is inputted to the operation unit 60 by the user (step S9). When it is judged that the positioning end instruction is not inputted (step S9; No), the positioning calculation unit 33 returns to step S1. When it is judged that the positioning end instruction is inputted (step S9; Yes), the positioning calculation unit 33 finishes the baseband processing.

On the other hand, when it is judged in step S1 that the positioning is performed for the second or subsequent times (step S1; No), the positioning calculation unit 33 performs the KF positioning processing by reading out and executing the KF positioning program 3513 stored in the ROM 35 (step S11). The positioning calculation unit 33 shifts the processing to step S7.

In the KF positioning processing, the positioning calculation unit 33 executes the processing according to the flowcharts shown in FIGS. 1 to 3. In executing the processing, in step A7 of the KF positioning processing shown in FIG. 1, the positioning calculation unit 33 performs the positioning mode judgment processing by reading out and executing the positioning mode judging program 3515 stored in the ROM 35.

Figure 12:
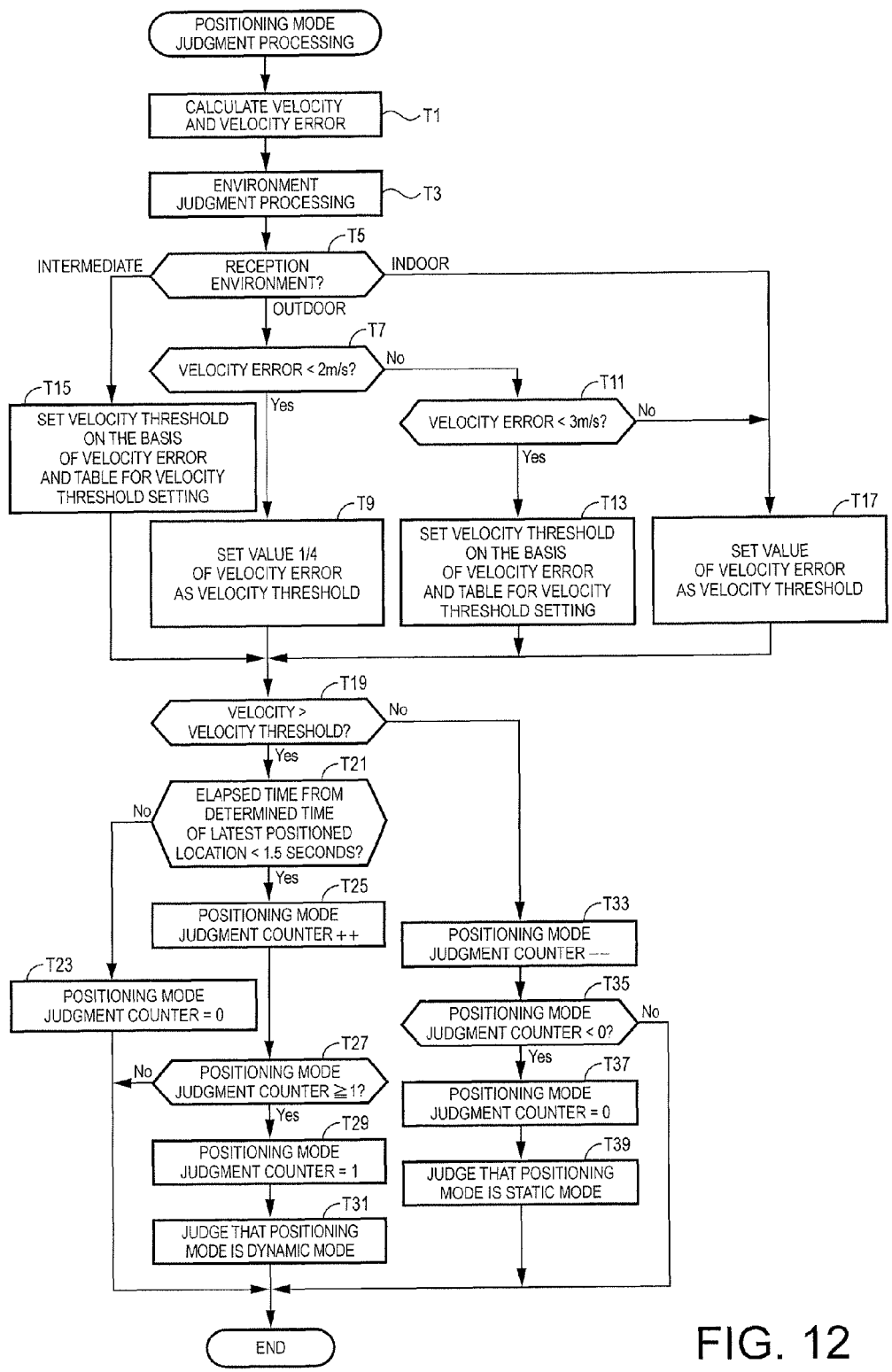
FIG. 12 is a flowchart of a flow of positioning mode judgment processing.

FIG. 12 is a flowchart of a flow of the positioning mode judgment processing.

First, the positioning calculation unit 33 calculates the velocity "V" and the velocity error "$\sigma_V$" of the portable phone 1 according to Formulas (8) and (9) (step T1). Subsequently, the positioning calculation unit 33 performs the environment judgment processing (step T3). Specifically, the positioning calculation unit 33 adds up signal intensities of GPS satellite signals received from the respective acquisition satellites to obtain an environment judgment score and stores the environment judgment score in the environment judgment score data 373 of the RAM 37. The positioning calculation unit 33 judges, according to the environment judgment score, which of the reception environments "outdoor", "intermediate", and "indoor" the present reception environment is (step T5).

When it is judged in step T5 that the reception environment is "outdoor" (step T5; outdoor), the positioning calculation unit 33 judges whether the velocity error "$\sigma_V$" calculated in step T1 is smaller than "2 m/s" (step T7). When it is judged that the velocity error "$\sigma_V$" is smaller than "2 m/s" (step T7; Yes), the positioning calculation unit 33 sets a value ¼ of (0.25 times as small as) the velocity error "$\sigma_V$" as a velocity threshold and stores the velocity threshold in the velocity threshold data 374 of the RAM 37 (step T9).

When the reception environment is "outdoor" and the velocity error "$\sigma_V$" is smaller than "2 m/s", this means that a reception environment of a GPS satellite signal is satisfactory and a velocity error is extremely small. Therefore, in this case, the positioning mode is easily set in the dynamic mode by setting the velocity threshold to an extremely small value.

On the other hand, when it is judged in step T7 that the velocity error "$\sigma_V$" is equal to or larger than "2 m/s" (step T7; No), the positioning calculation unit 33 judges whether the velocity error "$\sigma_V$" is smaller than "3 m/s" (step T11). When it is judged that the velocity error "$\sigma_V$" is smaller than "3 m/s" (step T11; Yes), the positioning calculation unit 33 sets a velocity threshold on the basis of the velocity error "$\sigma_V$" and the table for velocity threshold setting 353 stored in the ROM 35 (step T13).

Specifically, the positioning calculation unit 33 reads out the velocity error multiplication coefficient 3535 corresponding to the environment judgment score 3533 calculated in step T3 with reference to a data portion in which the reception environment 3531 is set as "outdoor" in the table for velocity threshold setting 353. The positioning calculation unit 33 sets a value obtained by multiplying the velocity error "$\sigma_V$" calculated in step T1 by the velocity error multiplication coefficient 3535 as a velocity threshold and stores the velocity threshold in the velocity threshold data 374 of the RAM 37.

When it is judged in step T5 that the reception environment is "intermediate" (step T5; intermediate), the positioning calculation unit 33 sets a velocity threshold on the basis of the velocity error "$\sigma_V$" and the table for velocity threshold setting 353 (step T15). The setting of the velocity threshold in this case is realized in the same manner as step T13 with reference to a data portion in which the reception environment 3531 is set as "intermediate" in the table for velocity threshold setting 353.

When it is judged in step T5 that the reception environment is "indoor" (step T5; indoor) or when it is judged in step T11 that the velocity error "$\sigma_V$" is equal to or larger than "3 m/s" (step T11; No), the positioning calculation unit 33 sets the velocity error "$\sigma_V$" calculated in step T1 as a velocity threshold and stores the velocity threshold in the velocity threshold data 374 of the RAM 37 (step T17).

After setting the velocity threshold in any one of steps T9, T13, T15, and T17, the positioning calculation unit 33 judges whether the velocity "V" of the portable phone 1 calculated in step T1 is larger than the velocity threshold (step T19). When it is judged that the velocity "V" is larger than the velocity threshold (step T19; Yes), the positioning calculation unit 33 judges whether elapsed time from determination time for a latest positioned location is shorter than "1.5 seconds" (step T21).

When it is judged that the elapsed time is equal to or longer than "1.5 seconds" (step T21; No), the positioning calculation unit 33 sets the positioning mode judgment counter to "0" (step T23) and finishes the positioning mode judgment processing. When the elapsed time from the determination time of the latest positioned location is equal to or longer than "1.5 seconds", long time elapses after a positioned location is determined (fixed) last. Therefore, the positioning calculation unit 33 performs positioning calculation by the Kalman filter in the same positioning mode without changing the positioning mode.

On the other hand, when it is judged in step T21 that the elapsed time is shorter than "1.5 seconds" (step T21; Yes), the positioning calculation unit 33 increments the positioning mode judgment counter stored in the positioning mode judgment counter data 375 (step T25). The positioning calculation unit 33 judges whether the positioning mode judgment counter is equal to or larger than "1" (step T27). When it is judged that the positioning mode judgment counter is smaller than "1" (step T27; No), the positioning calculation unit 33 finishes the positioning mode judgment processing.

When it is judged that the positioning mode judgment counter is equal to or larger than "1" (step T27; Yes), the positioning calculation unit 33 sets the positioning mode judgment counter to "1" (step T29). The positioning calculation unit 33 judges that the positioning mode is the dynamic mode and stores the dynamic mode in the positioning mode data 376 of the RAM 37 (step T31). Then, the positioning calculation unit 33 finishes the positioning mode judgment processing.

On the other hand, when it is judged in step T19 that the velocity "V" is equal to or smaller than the velocity threshold (step T19; No), the positioning calculation unit 33 decrements the positioning mode judgment counter of the acquisition satellite (step T33). The positioning calculation unit 33 judges whether the positioning mode judgment counter is smaller than "0" (step T35). When it is judged that the positioning mode judgment counter is equal to or larger than "0" (step T35; No), the positioning calculation unit 33 finishes the positioning mode judgment processing.

On the other hand, when it is judged that the positioning mode judgment counter is smaller than "0" (step T35; Yes), the positioning calculation unit 33 sets the positioning mode judgment counter to "0" (step T37). The positioning calculation unit 33 judges that the positioning mode is the static mode and stores the static mode in the positioning mode data 376 of the RAM 37 (step T39). Then, the positioning calculation unit 33 finishes the positioning mode judgment processing.

When the positioning mode judgment counter is set to "1", unless the velocity "V" falls below the velocity threshold twice in a row, the positioning mode judgment counter is not smaller than "0". This is because a condition for judging the positioning mode as the static mode is set strict because, depending on a reception environment of a GPS satellite signal, the velocity "V" may be accidentally equal to or smaller than the velocity threshold regardless of the fact that the portable phone 1 (the user) is moving.

4. Experiment Results

Figure 13:
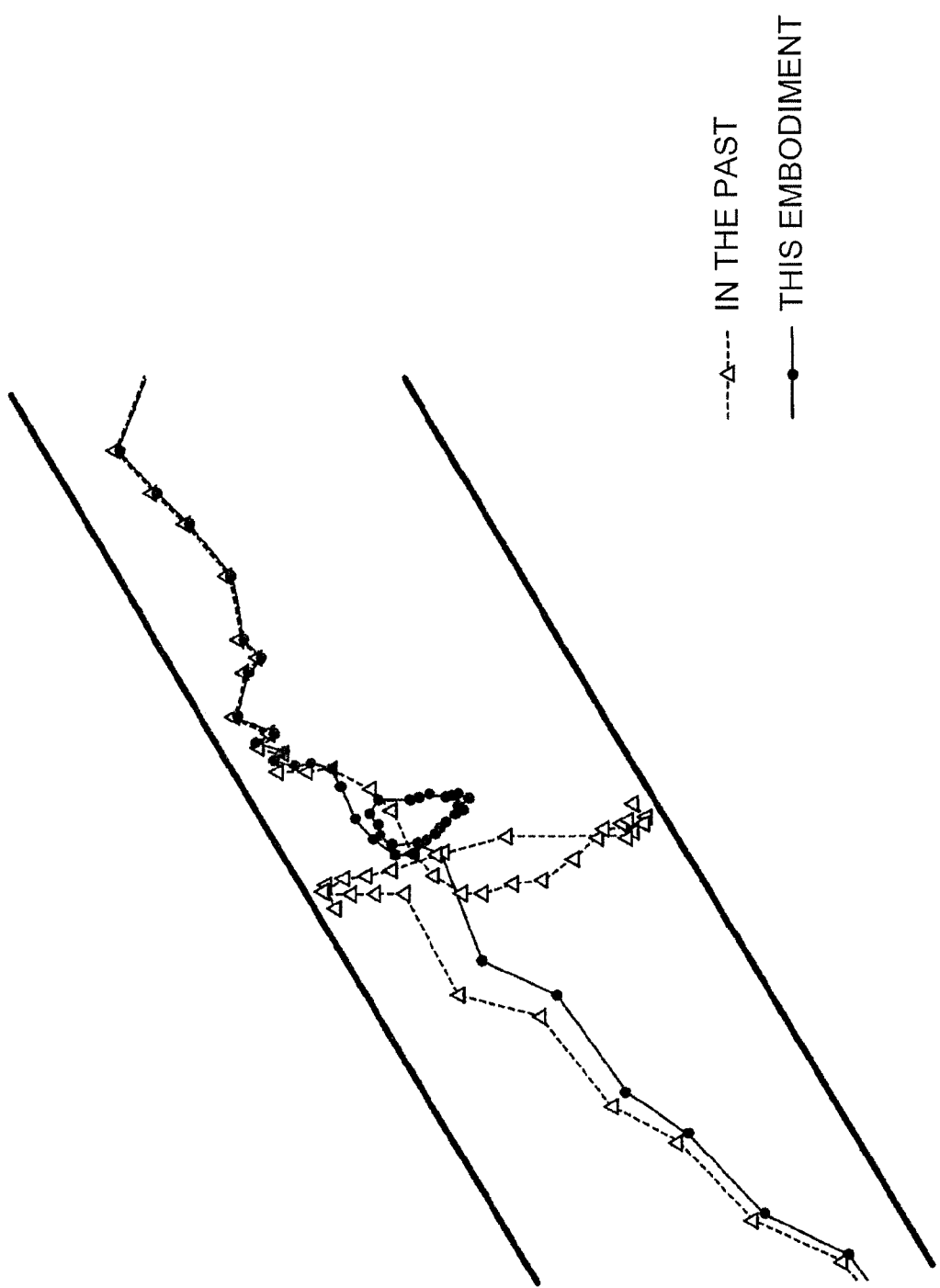
FIG. 13 is a diagram of an example of an experiment result.

FIG. 13 is a diagram of an example of experiment results obtained when positioning is performed in the processing in the past in which a velocity threshold of the Kalman filter is fixed and when positioning is performed in the processing according to this embodiment. The results shown in FIG. 13 indicate positioned locations at respective times when the user carrying the portable phone 1 starts to move with a car from the upper right in the figure on a road indicated by a pair of thick lines, stops the car for a predetermined period near the center of the road, and, then, starts the movement again to the lower left in the figure.

It is seen that, in the processing in the past, positioned locations substantially fluctuate in a portion where the vehicle should originally be stopped. On the other hand, in the processing according to this embodiment, positioned locations concentrate in the center of the road and accurate detection (positioning) of a stopped state of the car is successful.

Figure 14:
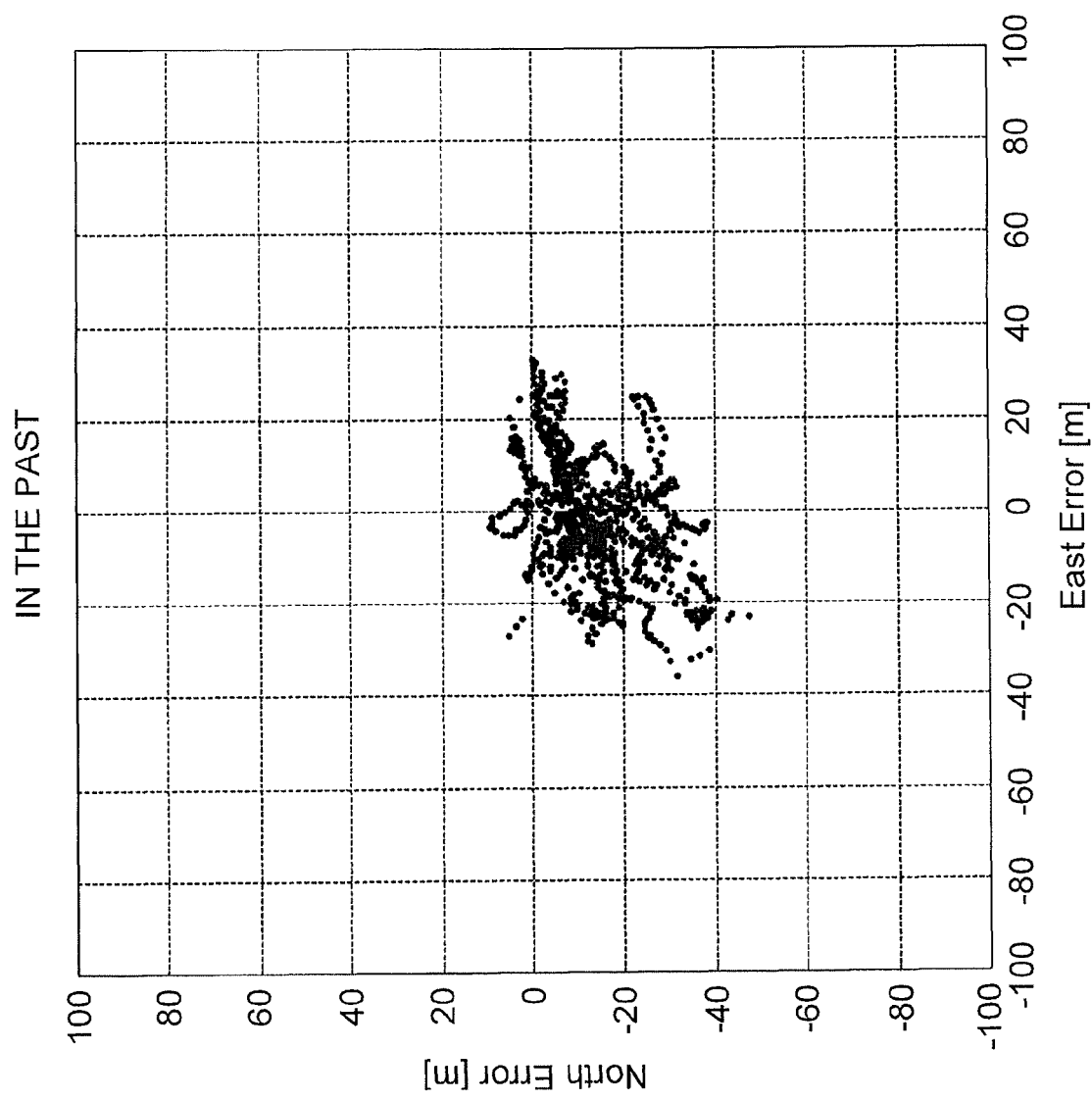
FIG. 14 is a diagram of an example of an experiment result.

FIG. 14 is a diagram of a distribution of positioning errors in the processing in the past. FIG. 15 is a diagram of a distribution of positioning errors in the processing according to this embodiment. In the figures, results obtained by setting the center of graphs as a true value (0, 0) and plotting an error [m] in the longitude direction on the abscissa and plotting an error [m] in the latitude direction on the ordinate are shown. It is seen that, whereas, in the processing in the past, a dispersion of errors (Sigma) is 22.13 [m], an average of errors (Avg Error) is 19.76 [m], and a maximum of errors (Max Error) is 52.66 [m], in the processing according to this embodiment, the dispersion of errors is 12.90 [m], the average of errors is 11.21 [m], and the maximum of errors is 30.18 [m] and positioning accuracy is improved.

5. Actions and Effects

According to this embodiment, the velocity error "$\sigma_V$" (accuracy of a velocity component) included in the velocity "V" of the portable phone 1 calculated from the state vector "V" corrected in the velocity correction processing is determined on the basis of the error covariance matrix "P" predicted in the velocity prediction processing. A velocity threshold (a velocity condition) for judging a moving state of the portable phone 1 is set on the basis of the velocity error "$\sigma_V$". The velocity "V" calculated from the state vector "V" corrected in the vehicle correction processing and the vehicle threshold set earlier are compared to judge a positioning mode (a moving state) of the portable phone 1. The Kalman filtering is executed with the process noise "Q" (a filter characteristic) corresponding to the positioning mode and the present location is positioned.

When a reception environment of a GPS satellite signal is satisfactory (e.g., an outdoor environment) and a velocity error of the state vector "X" is small, a velocity threshold is set low to make it easy to judge that the portable phone 1 is moving. Conversely, when a reception environment of a GPS satellite signal is dissatisfactory (e.g., an indoor environment) or when a velocity error of the state vector "X" is large even if the reception environment is satisfactory, a velocity threshold is set high to make it difficult to judge that the portable phone 1 is moving. This makes it possible to appropriately judge a moving state of the portable phone 1. A filter characteristic of the Kalman filter is changed to match the moving state of the portable phone 1. Consequently, a location delay and location drop-out are prevented from occurring with respect to an actual location of the portable phone 1 and positioning accuracy is improved.

6. Modifications

6-1. Electronic Apparatus

The invention is applicable to any electronic apparatus as long as the electronic apparatus includes a positioning device. The invention is also applicable to, for example, a notebook personal computer, a PDA (Personal Digital Assistant), a car navigation apparatus.

6-2. Satellite Positioning System

In the embodiment explained above, the GPS is explained as an example of the satellite positioning system. However, the satellite positioning system may be other satellite positioning systems such as a WAAS (Wide Area Augmentation System), a QZSS (Quasi Zenith Satellite System), a GLONASS (GLObal NAvigation Satellite System), and GALILEO.

6-3. Division of Processing

A part or all of the kinds of processing executed by the positioning calculation unit 33 may be executed by the host CPU 50. For example, the host CPU 50 executes the positioning mode judgment processing and the positioning calculation unit 33 executes the KF positioning processing according to a judged positioning mode. The host CPU 50 may also execute the KF positioning processing.

6-4. Environment Judgment Processing

In the explanation of the embodiment, an environment judgment score is calculated by adding up signal intensities of GPS satellite signals received from the respective acquisition satellites. However, an environment judgment score may be calculated on the basis of, for example a PDOP (Position Dilution Of Precision) value, which is an index value of a satellite arrangement. In this case, the environment judgment score is set higher as the PDOP value is smaller.

An environment judgment score may be calculated on the basis of an environment judgment function with the signal intensity and the PDOP value set as variables. The environment judgment function can be represented by, for example, a linear function proportional to the signal intensity and inversely proportional to the PDOP value. It goes without saying that, instead of calculating an environment judgment score using the environment judgment function, a table specifying a correspondence relation between signal intensities and PDOP values and environment judgment scores may be stored in the ROM 35 to calculate an environment judgment score according to the table.

Moreover, rather than performing environment judgment on the basis of an environment judgment score, environment judgment may be performed on the basis of direct values of the signal intensity of a reception signal and a PDOP value. In this case, a table in which ranges of signal intensities and PDOP values and environments are associated is stored in the ROM 35 and an environment is judged according to the table.

6-5. Setting of a Velocity Threshold

In the explanation of the embodiment, in the reception environment of "indoor", a value of the velocity error "$\sigma_V$" is directly set as a velocity threshold. However, the velocity threshold may be set in the same manner as in the reception environment of "outdoor" and "intermediate".

Specifically, in the table for velocity threshold setting 353 shown in FIG. 9, "indoor" is added to the reception environment 3531 and the velocity error multiplication coefficient 3535 is set to each of "0" to "9" of the environment judgment score 3533. In this case, a value of the velocity error multiplication coefficient 3535 is set smaller as the environment judgment score 3533 increases.

In the positioning mode judgment processing shown in FIG. 12, when it is judged in step T5 that an environment is "indoor", the positioning calculation unit 33 sets, with reference to a data portion in which the reception environment 3531 is set as "indoor" of the table for velocity threshold setting 353, a value obtained by multiplying the velocity error by the velocity error multiplication coefficient 3535 corresponding to the environment judgment score 3533 calculated in the environment judgment processing as a velocity threshold.

What is claimed is:

1. A positioning method in a positioning device that calculates a location of the positioning device by executing Kalman filtering, comprising:
   acquiring a satellite signal from a positioning satellite;
   predicting a state vector including a velocity component of the positioning device, and error covariance of the state vector;
   correcting the velocity component using a difference between a measured value and a predicted value of the reception signal frequency from the positioning satellite;
   determining accuracy of the corrected velocity component based on the error covariance;
   setting a velocity condition based on the determined accuracy, the setting the velocity condition including setting a threshold value of the velocity lower, as the determined accuracy becomes higher;
   judging a moving state of the positioning device by comparing the corrected velocity component and the threshold value of the velocity condition;
   changing a filter characteristic of the Kalman filtering based on the judged moving state; and
   calculating the location by executing the Kalman filtering with the filter characteristic after being changed.

2. The positioning method according to claim 1, wherein
   the setting of the velocity condition is setting velocity conditions of plural moving states including a stationary state of the positioning device,
   the judging of the moving state is judging which of the plural moving states is a present moving state of the positioning device, and
   the calculating of the location by executing the Kalman filtering with a filter characteristic corresponding to the judged moving state among respective filter characteristics of the plural moving states.

3. The positioning method according to claim 2, wherein
   the judging of the moving state is judging the moving state at a predetermined interval, and
   the judging of the moving state includes judging the stationary state when a velocity condition is continuously satisfied at the predetermined interval.

4. The positioning method according to claim 1, further comprising
   judging a reception environment of the positioning signal based on a reception signal, wherein
   the setting of the velocity condition is setting the velocity condition based on the determined accuracy and the reception environment.

5. The positioning method according to claim 4, wherein
   the judging of the reception environment is judging whether the reception environment is at least an outdoor environment or an indoor environment, and
   the setting the threshold value of the velocity is for judging whether or not the positioning device is in the stationary state, when the reception environment is judged to be the outdoor environment.

6. A non-transitory computer-readable-medium storing a program for causing a computer incorporated in a positioning device to execute the positioning method according to claim 1.

7. A positioning device that calculates a location of the positioning device by executing Kalman filtering, comprising:
   a signal acquiring unit that acquires a satellite signal from a positioning satellite;
   a state vector predicting unit that predicts a state vector including a velocity component of the positioning device, and error covariance of the state vector;
   a velocity component correcting unit that corrects the velocity component using a difference between a measured value and a predicted value of the reception signal frequency from the positioning satellite;
   an accuracy determining unit that determines accuracy of the corrected velocity component based on the error covariance;
   a velocity-condition setting unit that sets a velocity condition based on the determined accuracy, the velocity-condition setting unit that sets a threshold value of the velocity lower, as the determined accuracy becomes higher;
   a moving-state judging unit that judges the moving state of the positioning device by comparing the corrected velocity component and the threshold value of the velocity condition;
   a location calculating unit that changes a filter characteristic of the Kalman filtering based on the judged moving state, and calculates the location by executing the Kalman filtering with the filter characteristic after being changed.

8. The positioning device according to claim 7, wherein
   the velocity-condition setting unit sets velocity conditions of plural moving states including a stationary state of the positioning device,
   the moving-state judging unit judges which of the plural moving states a present moving state of the positioning device is, and
   the location calculating unit executes the Kalman filtering with a filter characteristic corresponding to the judged moving state among respective filter characteristics of the plural moving states.

9. The positioning device according to claim 8, wherein
   the moving-state judging unit judges a moving state at a predetermined interval, and
   the moving-state judging unit includes judging the stationary state when a velocity condition is continuously satisfied at the predetermined interval.

10. The positioning device according to claim 7, further comprising
    a reception-environment judging unit that judges a reception environment of the positioning signal based on a reception signal, wherein
    the velocity-condition setting unit sets the velocity condition based on the determined accuracy and the reception environment.

11. The positioning device according to claim 10, wherein
    the reception-environment judging unit judges whether the reception environment is at least an outdoor environment or an indoor environment, and
    the velocity-condition setting unit the threshold value of the velocity for judging whether or not the positioning device is in the stationary state, when the reception environment is judged to be the outdoor environment.

12. An electronic apparatus comprising the positioning device according to claim 7.

* * * * *